United States Patent [19]

DeKleine

[11] Patent Number: 5,585,688

[45] Date of Patent: Dec. 17, 1996

[54] COMPACT FLUORESCENT LAMP

[75] Inventor: Paul DeKleine, Holland, Mich.

[73] Assignee: Prolight, Holland, Mich.

[21] Appl. No.: 348,977

[22] Filed: Nov. 28, 1994

[51] Int. Cl.$^6$ ...................................... H01J 5/48
[52] U.S. Cl. ................. 313/318.01; 313/318.05; 313/318.09; 313/318.12; 313/634
[58] Field of Search .................. 313/318.01, 318.05, 313/318.09, 318.12, 485, 573, 634, 493; 439/228, 235, 236, 646

[56] References Cited

U.S. PATENT DOCUMENTS

| 287,285 | 12/1986 | Futatsugi et al. |
|---|---|---|
| 287,287 | 12/1986 | Futatsugi et al. |
| 289,798 | 5/1987 | Joosten. |
| 302,733 | 8/1989 | Sangen et al. |
| 304,030 | 10/1989 | Vakil. |
| 304,087 | 10/1989 | Porembski et al. |
| 4,777,405 | 10/1988 | Hermes et al. |
| 4,812,703 | 3/1989 | Kanematsu et al. |
| 4,841,193 | 6/1989 | Nakamura et al. |
| 4,879,494 | 11/1989 | Tuttle. |
| 5,059,855 | 10/1991 | Irisawa et al. |
| 5,362,246 | 11/1994 | Lau ................................. 439/236 |

OTHER PUBLICATIONS

High–Performance CLF Downlights The Best and The Brightest *Tech Update*, May 1993 E Source, Inc., pp. 7–18.

*Primary Examiner*—Sandra L. O'Shea
*Assistant Examiner*—John Ning
*Attorney, Agent, or Firm*—Dowell & Dowell

[57] ABSTRACT

A compact fluorescent lamp includes a body and a detachable fluorescent lamp unit. An Edison base is provided on the body to enable the lamp to be installed in an incandescent lighting fixture having an Edison screw-in socket. The body also includes an interchangeable socket insert which is adapted to receive the mounting base of the lamp unit. The socket insert may have different socket configurations to be compatible with conventional lamp units having different types of mounting bases and different power output ratings. The lamp unit includes a plurality of lamp tubes which extend parallel to each other from the mounting base. When the lamp is installed in the Edison socket, the lamp tubes are inclined downward from the horizontal at a small angle. In addition, the lamp tubes are oriented at an angle of approximately 45° relative to the horizontal, both above and below the lamp to provide enhanced light distribution.

15 Claims, 3 Drawing Sheets

COMPACT FLUORESCENT LAMP

BACKGROUND OF THE INVENTION

1. Technical Field

The invention is directed to the field of lighting and, more particularly, to a compact fluorescent lamp which is adapted to be installed in an Edison socket of an incandescent floor lamp fixture, table lamp fixture or the like.

2. Background of the Related Art

It is well known that compact fluorescent lamps are overall more cost efficient than incandescent lamps. Although compact fluorescent lamps are generally more expensive to purchase than incandescent lamps, they are more energy efficient and longer lasting, and thus provide long-term cost savings.

There has accordingly been an effort to increase the use of compact fluorescent lamps in new lighting fixtures and in retrofit applications. Although partially successful, the former effort has been limited by the higher purchase cost of the fluorescent lamps and because the savings that these lamps provide in terms of lower energy costs may not be realized in the short term.

The effort to install compact fluorescent lamps in retrofit applications has been limited by factors such as lamp orientation, lumen output and lamp fixture size. These factors have limited the use of compact fluorescent lamps in lighting fixtures such as floor and table lamps, where there remains a great retrofit potential.

Regarding lamp orientation, for table lamp applications, the known fixtures typically locate the lamp in a vertical plane, either in the so-called lamp "base-up" or "base-down" orientation. The vast majority of the fixtures in the market today include Edison screw-in type sockets and are oriented vertically.

It is known, however, that the optimal orientation of such compact fluorescent lamps is horizontal and not vertical. Some of the known recessed fixtures utilize a horizontal orientation of the lamp, but such fixtures are usually not suited for retrofit products.

For table lamp applications utilizing a twin or quad-type of compact fluorescent lamp, in addition to being base-down, the light must be reflected off the fixture lamp shade and then downward before it is emitted into the room space. Accordingly, the light output losses have been great in such applications based on the optimization ratings of the lamp manufacturers.

Regarding lamp size, in conventional table lamp fixtures, the configuration of the harp suspending the lamp shade has severely limited the applicability of the known self-ballasted compact fluorescent lamps. Such known lamps have been both too wide and too long to fit within the wireforms of the harps. These size factors have greatly limited the ability of compact fluorescent lamps to be used in retrofit applications and, in particular, applications which have required a high-lumen output such as 75 and 100 watt, or a greater incandescent equivalent.

Even where retrofit applications have been possible using the known compact fluorescent lamps, there has been the further problem that the lamps are frequently stolen and replaced with the less efficient incandescent lamps. This problem, known as "snap-back," has been reduced by incorporating theft protective features in the compact fluorescent lamps and in the socket adapters which have enabled the use of these lamps in Edison sockets.

SUMMARY OF THE INVENTION

The present invention has been made in view of the above-described inadequacies of the known lamps and has as an object to provide a compact fluorescent lamp which is suitable for use in Edison incandescent light sockets.

Another object of the invention is to provide a compact fluorescent lamp which can be installed in most of the table and floor lamp fixtures that are presently on the market and which delivers optimal lighting performance.

Yet another object of the invention is to provide a compact fluorescent lamp which can be used in fixtures requiring twin or quad-type fluorescent lamps and high lumen outputs.

Additional objects and advantages of the present invention will become apparent from the description and drawing figures which follow, or by practice of the invention.

To achieve the objects of the invention, the compact fluorescent lamp in accordance with a preferred embodiment of the invention is adapted to be used in combination with an incandescent lighting fixture having a vertically oriented Edison screw-in socket. The compact fluorescent lamp comprises a body and a fluorescent lamp unit.

The body includes a housing, a downward extending Edison base, and a lamp socket disposed in the housing.

The fluorescent lamp unit includes a mounting base and a plurality of lamp tubes which are mounted to the mounting base and extend parallel with respect to each other. The mounting base is adapted to be inserted in the lamp socket to assemble the lamp. When the Edison base is installed in the Edison socket of the fixture, each of the lamp tubes are substantially horizontally oriented and a pair of the lamp tubes are vertically aligned with each other such that the lamp tubes are oriented at an angle of approximately 45° relative to the horizontal, both above and below the lamp.

In accordance with the invention, the lamp socket is preferably provided in an interchangeable socket insert. A number of socket inserts, each having a different socket structure, may be provided for the lamp. The socket inserts are each adapted to be used with a specific conventional mounting base structure, which may be associated with a lamp unit of a specific lumen output rating.

DETAILED DESCRIPTION OF THE PREFERRED EMBODIMENT

Figure 1:
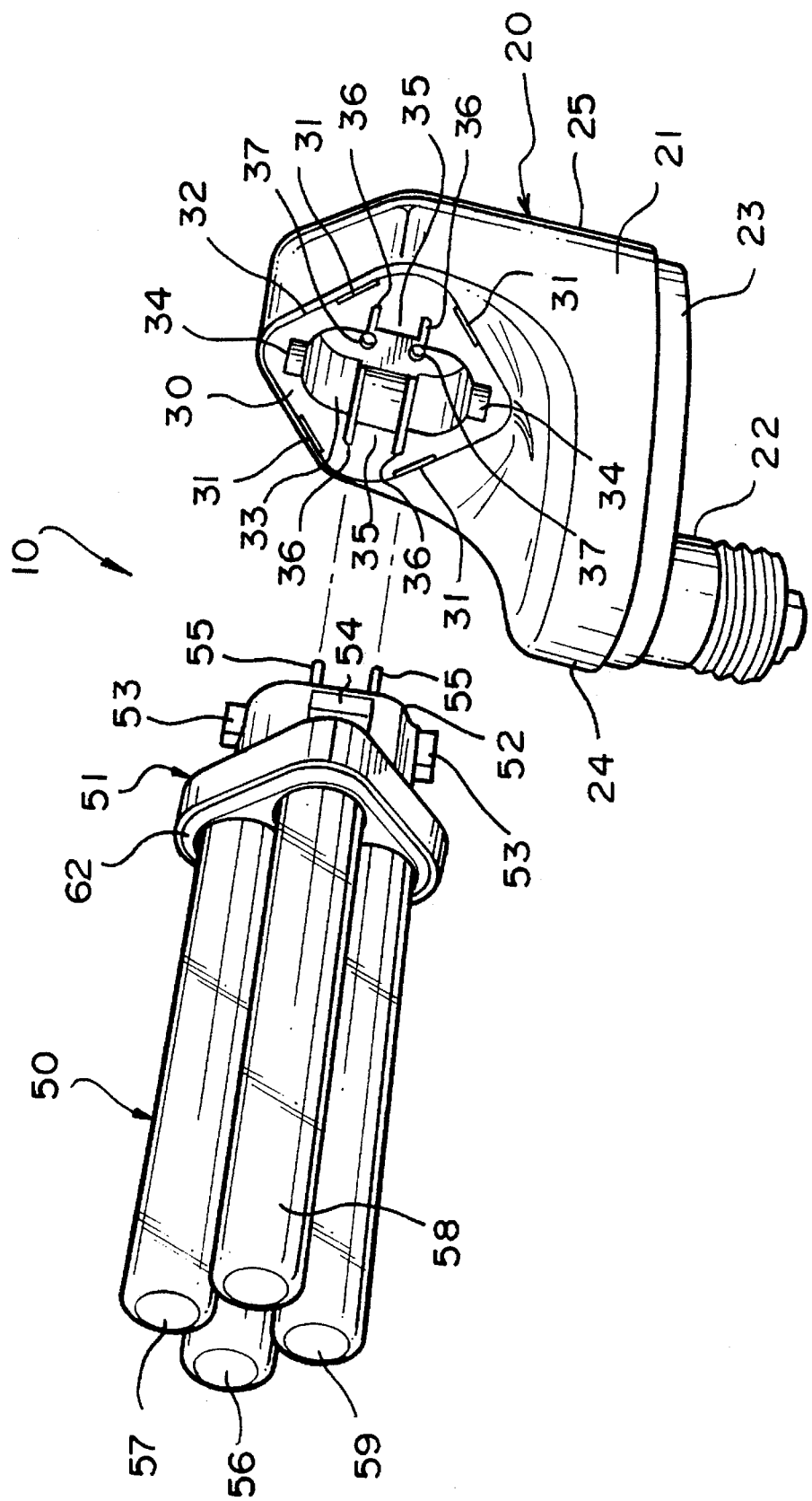
FIG. 1 is an illustrational view of a compact fluorescent lamp in accordance with a preferred embodiment of the invention.

With reference to the drawing figures, FIG. 1 illustrates a compact fluorescent lamp 10 in accordance with a preferred embodiment of the invention. The lamp comprises a lamp body 20, and a compact fluorescent lamp unit 50 which is adapted to be connected to the lamp body.

Figure 2:
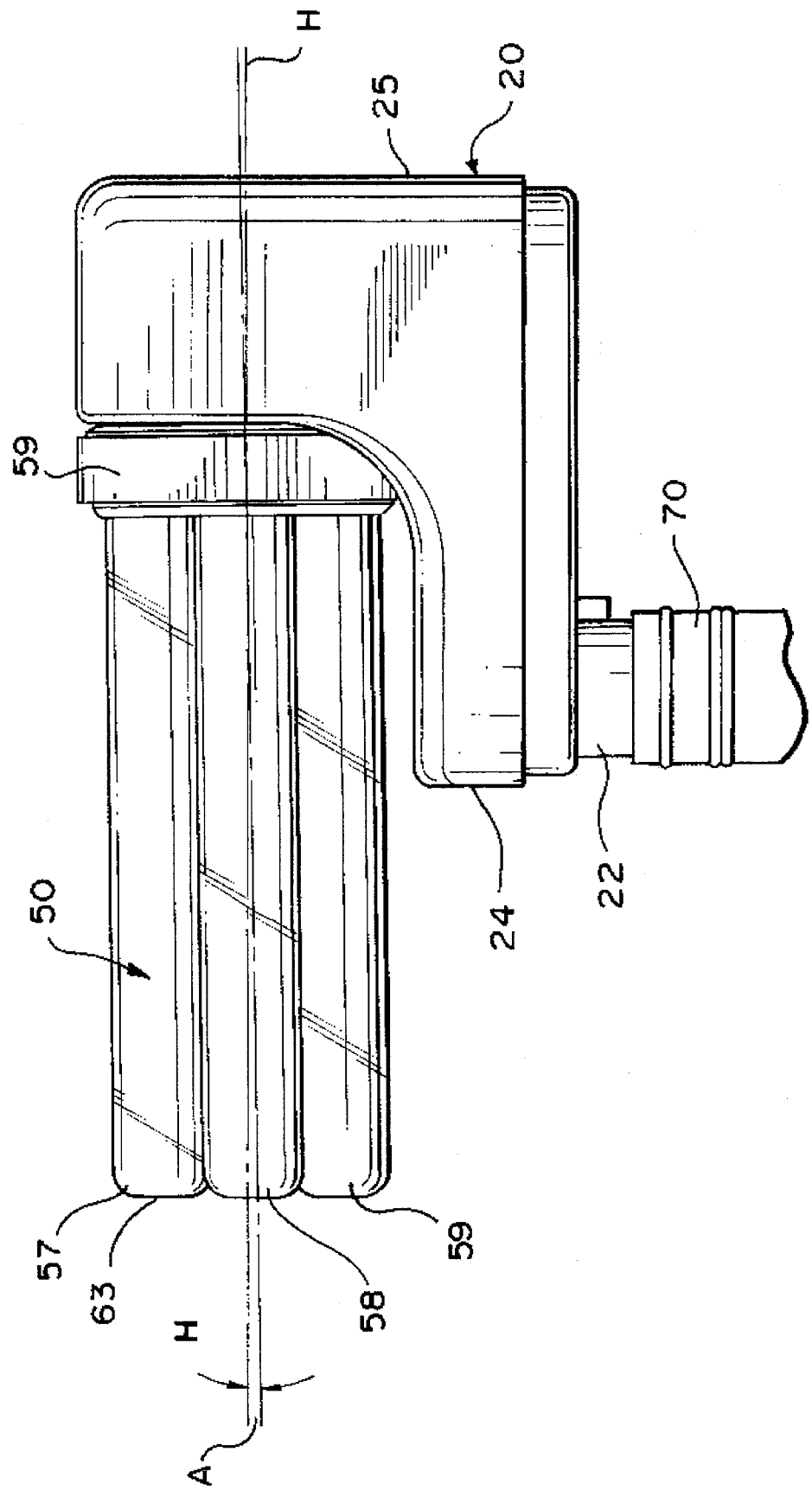
FIG. 2 is a side elevational view of the lamp of FIG. 1 as installed in a conventional Edison socket, illustrating the angle of inclination "A" of the lamp tubes relative to the horizontal.

The lamp body 20 comprises an outer housing 21 which encloses a ballast and electrical wiring (not shown). The housing is preferably composed of a plastic material which can be molded. A standard screw-in Edison base 22 extends downward from the bottom wall 23 of the housing. The lamp body preferably comprises a rachet mechanism (not shown), which when engaged causes the housing to pivot freely about the Edison base. Referring to FIG. 2, this mechanism is provided to prevent the installed lamp from being screwed out of an Edison socket 70 and subsequently replaced by an incandescent lamp. To remove the lamp from the Edison socket, an appropriate tool is used to disengage the rachet mechanism to allow the Edison base to be screwed out of the Edison socket by turning the housing. The Edison socket may be in a floor lamp fixture, a table lamp fixture or the like (not shown).

The lamp body 20 further comprises a removable lamp socket insert 30 which is fitted within the housing 21. To facilitate the removal of the lamp socket insert from the housing for the purpose of installing another insert, spaced grooves 31 are formed along the outer edge 32 of the insert to receive the head of a screwdriver or other suitable tool.

Figure 4:
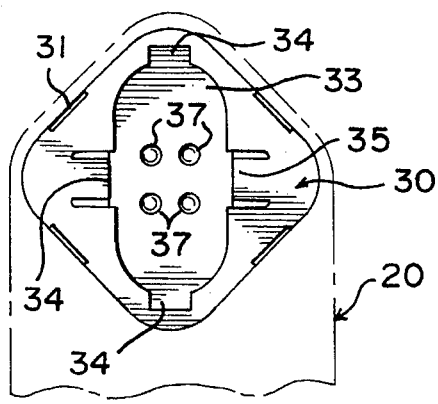
FIG. 4 is a front view of the body portion of the lamp of FIG. 1, illustrating a preferred embodiment of the interchangeable socket insert.

Referring to FIG. 1, the socket insert 30 defines a plug-in socket 33 to receive the plug-in portion 52 of the base 51 of the lamp unit 50. Referring to FIG. 4 which is a front view of the socket insert 30 of FIG. 1, the socket 33 includes a pair of opposed channels 34 at the ends of the socket and a pair of resilient recessed catches 35 formed in the sidewall of the socket. The catches are defined by slots 36 formed in the sidewall of the socket. The channels 34 are provided to receive the guide pairs 53 disposed on the plug-in portion 52 of the base 51 of the lamp unit. The catches 35 are provided to frictionally engage the guide pairs 54 (only one guide 54 is shown in FIG. 1) disposed on the base 51. The socket insert includes four female electrical contacts 37 (only two are shown in FIG. 1), and is compatible with lamp units having four male electrical contacts arranged in the same configuration as the female contacts (only two male electrical contacts 55 are shown in FIG. 1). The female electrical contacts are electrically connected to the ballast and the Edison base (not shown).

Figure 5:
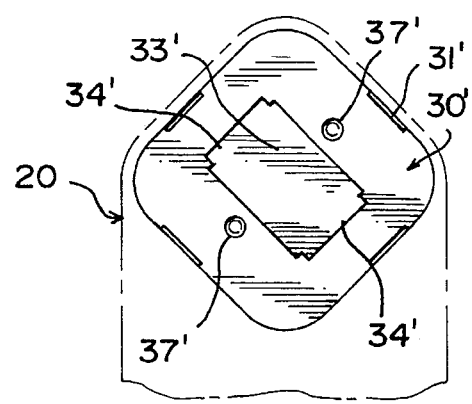
FIG. 5 is a view similar to FIG. 4 illustrating another preferred embodiment of the socket insert.

FIG. 5 illustrates another preferred embodiment of the socket insert 30'. The illustrated insert 30' defines a socket 33' which is inclined from the horizontal at an angle of approximately 45°. The socket includes two opposed channels 34' at the ends of the socket and two female electrical contacts 37'. This insert is compatible with lamp units including plug-in bases with two guides and two male electrical contacts (not shown).

In accordance with the invention, the socket insert is preferably provided in different socket structures than those illustrated herein. Such different socket structures make the body portion compatible with the most widely used types of conventional compact fluorescent lamp units in the market today, which are characterized as having different types of lamp bases and different power output ratings. By providing different interchangeable socket inserts, the versatility of the lamp is significantly enhanced. Moreover, the lamp can be formed at a low tooling cost because a single body structure can be used with different socket inserts, and the socket inserts are inexpensive to manufacture.

Another advantage of the compact fluorescent lamp in accordance with the invention is its compact structure. As illustrated in FIG. 1, the Edison base 22 is located adjacent to the front wall 24 of the housing, and most of the lamp body is located rearward of the Edison base, to form a cantilevered-like construction. In addition, the socket insert 30 is located adjacent to the back wall 25 of the housing at a maximum horizontal distance from the Edison base.

Figure 3:
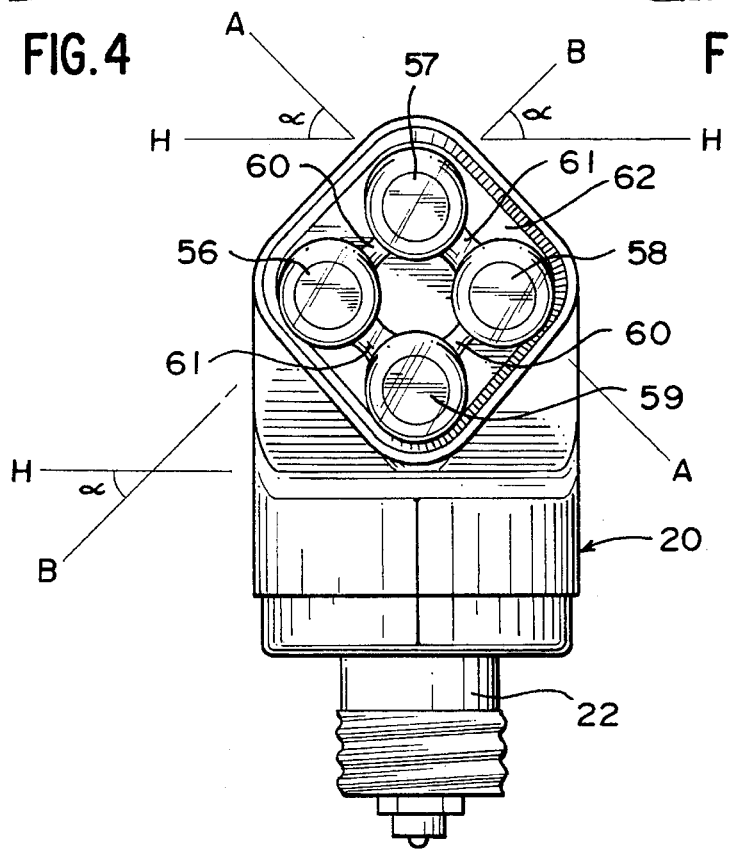
FIG. 3 is a front elevational view of the lamp of FIG. 1 as assembled.

The lamp unit comprises a plurality of lamp tubes. The lamp unit illustrated in FIG. 2 comprises four lamp tubes 56, 57, 58 and 59. As shown in FIG. 3, the lamp tubes are connected to each other by bridges 60 and 61 and extend from the mounting portion 62 of the base 51. Lamp units having different numbers of lamp tubes may optionally be used in the lamp. Referring again to FIG. 2, the lamp unit 50 is shown as assembled and the Edison base of the lamp screwed into an Edison socket 70.

As shown, the lamp tubes are parallel relative to each other and oriented in a substantially horizontal orientation. The lamp tubes are inclined downward relative to the horizontal "H" at a small angle "A", which is preferably about 3°. This angle is provided by the inclination of the socket insert 30 at about the same angle "A" relative to the vertical. It is known that this slight horizontal inclination of the lamp tubes causes the "cold spot" to form at a desirable location within the tubes and accordingly provides an increased light output as compared to the conventional base-down and base-up orientations.

Referring to FIG. 3, when the lamp unit 50 is mounted to the body 20, a pair 57, 59 of the lamp tubes are vertically aligned, and another pair of the lamp tubes 56, 58 are horizontally aligned. This particular arrangement positions the lamp tubes at an angle x of approximately 45° relative to the horizontal, H and also to any horizontal surfaces of the room, located above and below the lamp (not shown). As depicted, for example, two inclined planes A—A and B—B pass through the lamp tube 57 and are approximately perpendicular to each other. This tube positioning provides an optimal light intensity distribution of the compact fluorescent lamp. It also reduces the amount of light reflection off the lamp shade fixture (not shown) of the lamp, such that the light is more directly emitted from the lamp through the bottom and the top openings of the lamp shade, and the lamp provides a higher lighting efficiency.

The cantilevered structure of the body 20 and the location of the socket insert together provide the advantage of a more compact lamp structure. When the lamp is installed in an Edison socket 70 as shown in FIG. 2, the lamp is approximately centered along its length dimension relative to the base. That is, the distance from the Edison base 22 to the front end 63 of the lamp tubes is approximately equivalent to the distance from the Edison base to the back wall 25 of the housing. Accordingly, the lamp does not extend horizontally beyond the lamp shade and the light is directed substantially upward and downward within the lamp shade to provide an increased lighting efficiency.

As shown in FIG. 1, the lamp in accordance with the invention is also compact because the shape of the housing 21 and the socket insert 30 conform to the shape of the mounting base 51 of the lamp unit.

The compact construction of the compact fluorescent lamp overcomes the size-related problems which have limited the retrofit application of the known lamps in the existing fixtures. The present compact fluorescent lamp is shorter than the known lamps because the lamp tubes are horizontally oriented, and it is also narrower than the known lamps such that it can fit between the wireforms of most of the conventional harps. Consequently, the present lamp provides the advantage that it can be retrofit between the wireforms of nearly all conventional lamp fixture harps presently in the market, and also maintain a compact profile which does not interfere with most of the conventional lamp fixture shades.

In addition to its compact size, the fluorescent lamp in accordance with the invention also provides the advantage that it can be used in applications that require a wide range of lumen outputs, due to the provision of the interchangeable socket insert. For example, by selecting a socket insert which is compatible with a high-lumen lamp unit, the present lamp can be installed in fixtures requiring a high lumen output. This feature overcomes a problem which has greatly limited the retrofit application of the known lamps.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims, and their equivalents.

What is claimed is:

1. A compact fluorescent lamp for use in combination with an incandescent lamp fixture including a vertically oriented Edison screw-in socket, comprising:

a body including an outer housing, an Edison base extending downward from said housing, and a lamp socket disposed in said housing; and a fluorescent lamp unit including a mounting base and four lamp tubes extending from said mounting base parallel relative to each other, said mounting base being received in said lamp socket in an assembled condition of the lamp, and when said Edison base is used in the Edison socket, in the assembled condition, each of said lamp tubes are downwardly inclined at an angle of approximately 3° relative to the horizontal, two of said lamp tubes lie longitudinally in a horizontal plane and the other two of said lamp tubes lie longitudinally in a vertical plane, and each of said lamp tubes lies in a pair of inclined planes, and the inclined planes each being oriented at an angle of approximately 45° relative to the horizontal and being oriented perpendicularly relative to the other of the pair of inclined planes.

2. The compact fluorescent lamp of claim 1, wherein said housing comprises a bottom wall, a front wall and a rear wall, said Edison base is disposed on said bottom wall adjacent to said front wall, and said lamp socket is disposed adjacent to said rear wall, such that said body has a cantilevered structure.

3. The compact fluorescent lamp of claim 2, wherein said lamp unit includes a front end opposite to said mounting base, and in the assembled condition said front end and said rear wall of said housing are approximately equally spaced from said Edison base.

4. A compact fluorescent lamp for use in an incandescent lamp fixture including a vertically oriented Edison screw-in socket, comprising:

a body including an outer housing, an Edison base extending downwardly from said housing, and a socket insert adapted to be removably fitted within said housing; and a fluorescent lamp unit including a mounting base and a four lamp tubes extending from said mounting base parallel with respect to each other, said mounting base being received in said socket insert in the assembled condition of the lamp in which each of said lamp tubes are inclined downwardly at an angle of approximately 3°, a pair of said lamp tubes lie longitudinally in a vertical plane and another pair of said lamp tubes lie longitudinally in a horizontal plane, each of said lamp tubes lies in a pair of inclined planes, and the inclined planes each being oriented at an angle of approximately 45° relative to the horizontal and being oriented approximately perpendicularly relative to the other of the pair of inclined planes.

5. The compact fluorescent lamp of claim 4, wherein the assembled condition, each of said tubes are inclined downward from the horizontal at an angle of approximately 3°.

6. The compact fluorescent lamp of claim 5, wherein said housing comprises a bottom wall, a front wall and a rear wall, said Edison base is disposed on said bottom wall adjacent to said front wall, and said lamp socket is disposed adjacent to said rear wall, such that said body has a cantilevered structure.

7. The compact fluorescent lamp of claim 6, wherein said lamp unit includes a front end opposite to said mounting base, and in the assembled condition said front end and said rear wall of said housing are approximately equally spaced from said Edison base.

8. A compact fluorescent lamp for use in combination with an incandescent lamp fixture including a vertically oriented Edison screw-in socket, comprising:

a body including an outer housing, an Edison base extending downward from said housing, and a socket insert removably fitted within said housing; and a fluorescent lamp unit including a mounting base and a plurality of lamp tubes extending from said mounting base parallel relative to each other, said mounting base being received in said lamp socket in an assembled condition of the lamp, and when said Edison base is installed in the Edison socket, each of said lamp tubes are inclined downward from the horizontal at an angle of approximately 3°, and a pair of said lamp tubes lie longitudinally in a horizontal plane and another pair of said lamp tubes lie longitudinally in a vertical plane, and each of said lamp tubes lies in a pair of inclined planes, and the inclined planes each being oriented at an angle of approximately 45° relative to the horizontal and being oriented approximately perpendicularly relative to the other of the pair of inclined planes.

9. The compact fluorescent lamp of claim 8, wherein said lamp unit comprises four lamp tubes.

10. The compact fluorescent lamp of claim 8, wherein said housing comprises a bottom wall, a front wall and a rear wall, said Edison base is disposed on said bottom wall adjacent to said front wall, and said lamp socket is disposed adjacent to said rear wall, such that said body has a cantilevered structure.

11. The compact fluorescent lamp of claim 10, wherein said lamp unit includes a front end opposite to said mounting base, and in the assembled condition said front end and said rear wall of said housing are approximately equally spaced from said Edison base.

12. A compact fluorescent lamp for use in an incandescent lamp fixture including a vertically oriented Edison screw-in socket, comprising:

a body including an outer housing, an Edison base extending downward from said housing, and a lamp socket disposed in said housing; and a fluorescent lamp unit including a mounting base and a plurality of lamp tubes extending from said mounting base parallel relative to each other, and oriented at an angle of approximately 45° relative to an adjacent lamp tube said mounting base being received in said lamp socket in the assembled condition of the lamp, and when said Edison base is used in the Edison socket in the assembled condition, each of said lamp tubes are downwardly inclined at an angle of approximately 3°, first and second of said plurality of lamp tubes lie longitudinally in a vertical plane and third and fourth of said plurality of said lamp tubes lie longitudinally in a horizontal plane, the first and second lamp tubes each being approximately equidistant with respect to the third lamp tube, and the first and second lamp tubes each being approximately equidistant with respect to the fourth lamp tube.

13. The compact flurorescent lamp of claim 12, wherein said body has a cantilevered structure.

14. The compact fluorescent lamp of claim 13, wherein said fluorescent lamp unit includes a front end opposite to said mounting base, and said front end and said rear wall of said housing are approximately equally spaced from said Edison base in the assembled condition.

15. The compact fluorescent lamp of claim 14, wherein said fluorescent lamp unit comprises four lamp tubes.

* * * * *